United States Patent
Rutters et al.

(10) Patent No.: US 7,044,120 B1
(45) Date of Patent: May 16, 2006

(54) BASEPLATE FOR TOOL

(76) Inventors: Marc Rutters, 1316 N. Melrose, Suite G, Vista, CA (US) 92083; William Edwards, 1316 N. Melrose, Suite G, Vista, CA (US) 92083

( * ) Notice: Subject to any disclaimer, the term of this patent is extended or adjusted under 35 U.S.C. 154(b) by 137 days.

(21) Appl. No.: 10/130,321

(22) PCT Filed: Nov. 13, 2000

(86) PCT No.: PCT/US00/31210

§ 371 (c)(1),
(2), (4) Date: Sep. 23, 2002

(87) PCT Pub. No.: WO01/34360

PCT Pub. Date: May 17, 2001

Related U.S. Application Data

(63) Continuation-in-part of application No. 09/438,188, filed on Nov. 11, 1999, now Pat. No. 6,367,468.

(51) Int. Cl.
*B28D 5/04* (2006.01)

(52) U.S. Cl. .............................. 125/36; 30/374; 125/1; 125/13.01

(58) Field of Classification Search ................. 30/276, 30/373, 374, 375, 376, 377; 125/1, 12, 13.01, 125/36, 38
See application file for complete search history.

(56) References Cited

U.S. PATENT DOCUMENTS

| | | | |
|---|---|---|---|
| 1,404,342 A * | 1/1922 | Clarke | 451/352 |
| 2,676,624 A | 4/1954 | Gecmen | |
| 4,251,174 A | 2/1981 | Satler | |
| 4,334,356 A | 6/1982 | Krosunger | |
| 4,915,550 A | 4/1990 | Arai | |
| 4,938,201 A | 7/1990 | Chiuminatta | |
| 5,240,359 A | 8/1993 | Backhouse | |
| 5,666,939 A * | 9/1997 | Chiuminatta et al. | 125/13.01 |
| 5,784,789 A | 7/1998 | Vargas | |
| 6,305,089 B1 * | 10/2001 | Berndt | 30/374 |
| 6,568,088 B1 * | 5/2003 | Ende | 30/371 |

FOREIGN PATENT DOCUMENTS

DE  3404555  8/1985

* cited by examiner

*Primary Examiner*—Timothy V. Eley

(57) ABSTRACT

A baseplate for a tool having a support member with a passage way therein which has an inlet for receiving fluid and at least one outlet for directing fluid underneath the support member and rotating means attached to the bottom of the support member. The invention increases the ease of movement of the tool and reduces the chances of scratching the surface of the substrate upon which work is being performed.

12 Claims, 4 Drawing Sheets

BASEPLATE FOR TOOL

CROSS-REFERENCE TO RELATED APPLICATIONS

This is a continuation-in-part of application Ser. No. 09/438,188, filed Nov. 11, 1999, now U.S. Pat. No. 6,367,468.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION i. Technical Field

The present invention relates to baseplates for tools. More specifically, the present invention relates to a novel baseplate for routers, edging machines, milling machines, saws and polishing tools. These tools are commonly used to work and finish many different types of materials including masonry, stone, glass, ceramic and metal. Routers, edging machines and milling a machines are commonly used, for example, to carve a particular edge design in a counter top or sheet of glass. Saws are commonly used to cut many different types of materials including masonry, stone, glass, ceramic and metal. Polishing tools are used to finish and polish many different types of materials including masonry, stone, glass, ceramic and metal. The baseplate of such tools is generally described as the portion of the tool that contacts the substrate upon which work is being done, excluding the blade or wheel of the tool.

ii. Background Art

Routers, edging machines, milling machines, saws and polishing tools have been known in the art for a considerable time. Generally, such tools are quite heavy (for example, approximately sixty pounds) and are difficult to move across the surface of a substrate.

In prior art masonry tools, for example, one approach taken to minimize this problem is to place ball casters in the baseplate of the tool. For example, until recently, at least one manufacturer of masonry routers used nylon balls positioned in the baseplate. These balls are designed to roll across the surface of the substrate easing movement of the router. One disadvantage of this approach is that fragments of the substrate and dust are impressed into the ball and/or caught in the ball socket. These fragments or dust may then jam the ball and prevent the ball from rolling smoothly. This makes the tool difficult to move and control. The fragments and dust may also become caught between the ball and the substrate surface. In such a situation, movement of the tool may result in the surface of the substrate being scratched. This is especially disadvantageous when working with a substrate which has a surface that is finished and polished.

One approach the prior art has taken to minimize the problems associated with the ball casters described above is to eliminate the ball casters and produce a cushion of water under the baseplate. Pursuant to this approach, water is expelled from the baseplate and the baseplate of the tool floats across the substrate surface on the cushion of water without the use of ball casters. While this approach avoids the jamming and scratching problems described above, it does not always result in easy movement across the substrate surface. This problem is particularly pronounced when the tool approaches a corner of the substrate. In such a situation, the cushion of water deteriorates as the water runs over the edge of the substrate and the tool no longer floats across the substrate surface. Rather, the tool must be dragged along with its baseplate resting directly on the substrate. This presents scratching problems and results in the tool being difficult to move and control. The difficulty of movement and control is particularly problematic when it occurs at a corner which often requires more attention to detail than a straight edge.

U.S. Pat. No. 5,784,789 ("Vargas") discloses a rotary trim saw for cutting materials in difficult to reach places. Vargas teaches that the trim saw may have a base having ball caster type wheels.

German Patent Document No. DE 3,404,555 (The "German Disclosure") discloses an apparatus for machining a stack of metal sheets. The German Disclosure teaches that the stack of metal sheets may be held against each other and against the work table surface by hydrostatic pressure. The machine blade is surrounded by a ring, with multiple nozzles. Pressurized fluid is pumped from the nozzles such that there is a clearance between the underside of the ring and the top metal sheet. The German Disclosure teaches that by holding the sheets in position in this manner, the top sheet is not damaged in the machining process.

None of the foregoing prior art have suggested the present invention.

DISCLOSURE OF INVENTION

The present invention relates to a baseplate for tools that reduces the difficulty of movement and control problems as well as the attendant scratching problems associated with the prior art. The invention includes a support member for moving a tool over a work surface. The support member has a passageway therein with an inlet for receiving fluid and a plurality of outlets for directing fluid underneath the support member. A plurality of rotating members are mounted to the bottom of the support member for allowing the support member to move relative to the work surface. The direction of fluid underneath the support member assists in the movement of the support member relative to the work surface. Thus, the rotating members and the fluid underneath the support member cooperate to facilitate the movement of the support member relative to the work surface.

In one embodiment of the invention, the rotating members are main rotating balls mounted within sockets on the underside of the baseplate. In another embodiment, the sockets are continuously flushed with fluid which continuously cleans the sockets of debris, preventing the the main rotating balls from jamming and minimizing the chances of scratching the substrate. Ball bearings may be included to facilitate the rotation of the main rotating balls. In another embodiment of the invention, the main rotating balls are combined with fluid outlets in the underside of the baseplate that produce a cushion of fluid upon which the masonry tool floats. In another embodiment, the prior two embodiments are combined; fluid outlets are positioned on the underside of the baseplate and fluid outlets are positioned in the ball sockets which are continuously flushed as described above.

In operation, the outlets directing fluid underneath the baseplate of the invention produce a cushion of fluid.

Pressurized water may be used as the fluid. Much, if not all, of the weight of the tool is borne by the cushion of fluid underneath the support member when the fluid cushion is present. When the fluid cushion substantially deteriorates, such as when the tool approaches a corner, much, if not all of the weight of the masonry tool is borne by the rotating members. In one embodiment these rotating members are main rotating balls located within recesses in the support member. In another embodiment, the fluid outlets are positioned within the recesses to continuously expel fluid into the recesses holding the main rotating balls. This expelled fluid continuously flushes the recesses reducing the chance of debris being caught in the recesses and/or the main rotating balls, jamming the main rotating balls and potentially scratching the surface of the substrate.

BEST MODE FOR CARRYING OUT THE INVENTION

The following description is of the best presently contemplated modes of carrying out the invention. This description is made for the purpose of illustrating the general principles of the invention and should not be taken in a limiting sense.

The Figures and following example use the baseplate for a masonry router as an example of the invention. The use of a router baseplate to illustrate the invention should not be construed to limit the scope of the invention to only masonry routers, as one skilled in the art will appreciate that the principles illustrated here are equally applicable to many different types of tools including, but not limited to tools for working masonry, glass, metal, ceramic and polymer.

The Overall Structure and Operation of the Baseplate

Figure 1:
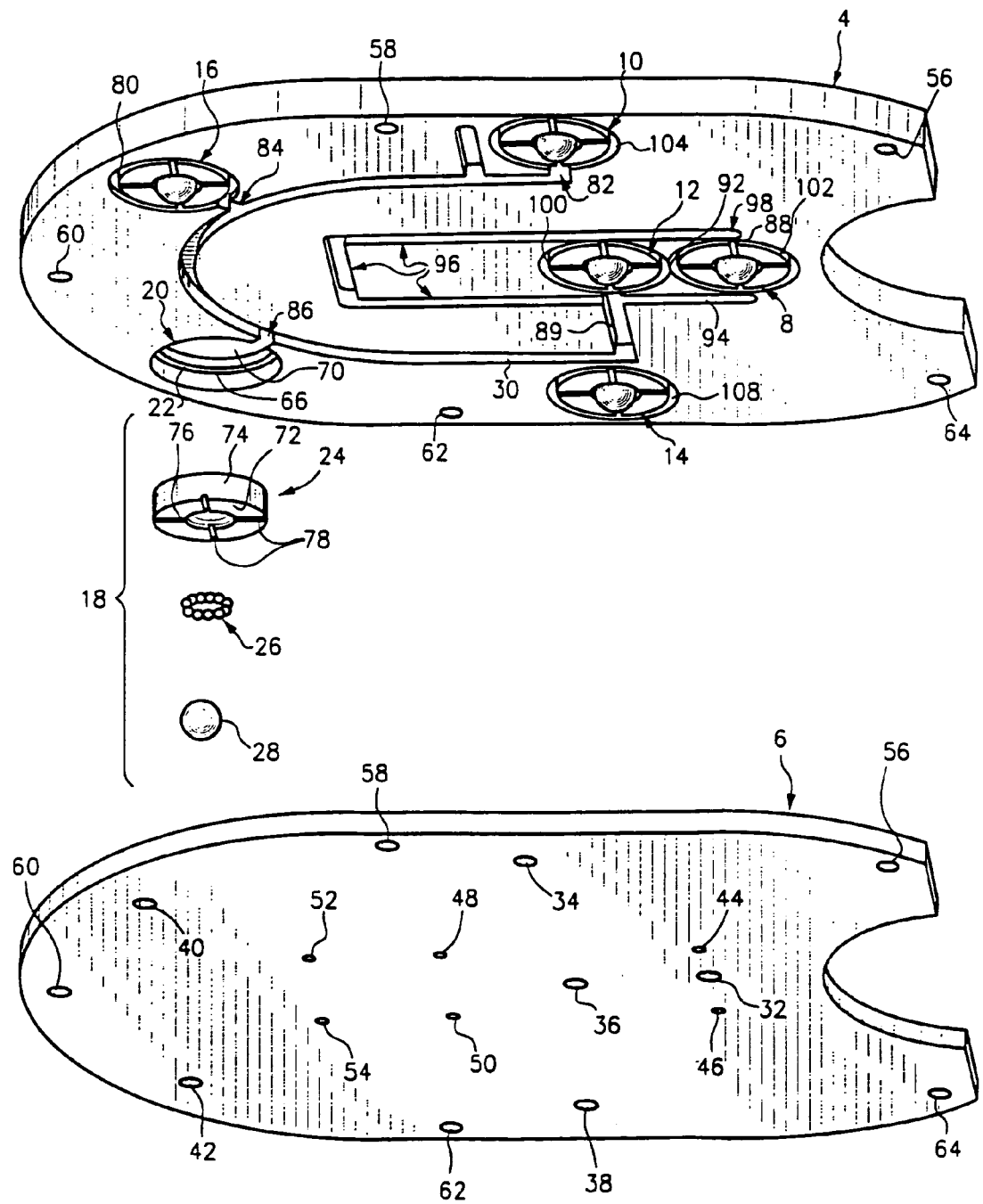
FIG. 1 is an exploded perspective view of a baseplate in accordance with the principles of the invention.
Figure 3:
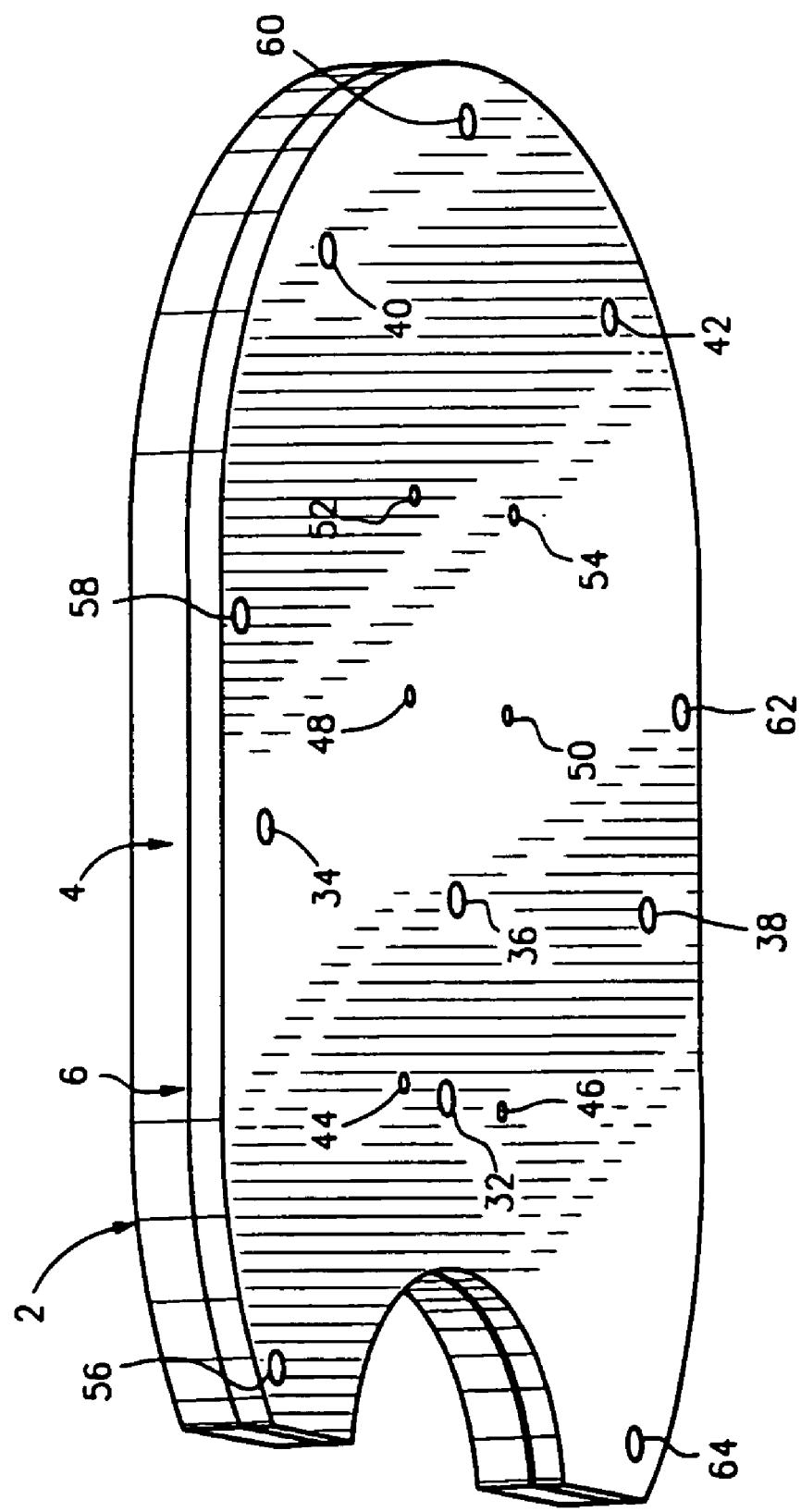
FIG. 3 is a perspective view of an assembled baseplate in accordance with the principles of the invention.

FIG. 1 shows an exploded perspective view of a router baseplate or support member designated generally as 2 in FIG. 3. Support member 2 is composed of two plates, a top plate 4 and a skid plate 6. The two plates 4 and 6 are preferably held together with screws (not shown) but may also be held together by any other known means. The exact placement of the screws is not shown but such placement is well within the skill of those reasonably skilled in the art. Skid plate 6 is the surface that is closest to the substrate (not shown) upon which the router is working. Top plate 4 may be made from aluminum or any other suitable material. Skid plate 6 may be made from aluminum, a polymer such as Delrin™, or any other material. Skid plate 6 may be coated with a silicon, rubber, polymer or other compound such as Salistac S™.

Support member 2 contains six bearing block assemblies designated generally as 8, 10, 12, 14, 16, and 18. Each bearing block assembly includes a bearing block designated generally as 24, a plurality of ball bearings 26, and one main rotating ball 28. Skid plate 6 has six openings 32, 34, 36, 38, 40 and 42. When the skid plate 6 is attached to the top plate 4, the main rotating balls 28 of each bearing block assembly 8, 10, 12, 14, 16, and 18 partially protrude through openings 32, 34, 36, 38, 40, and 42 respectively. Thus, when the router sits upon a substrate, the substrate is contacted only by a small portion of the main rotating balls 28 of bearing block assemblies 8, 10, 12, 14, 16, and 18.

Support member 2 also contains a water passageway designated generally as 30. Specific portions of water passageway 30 are also designated as 89, 94, 96, and 98. Support member 2 also contains six water jets 44, 46, 48, 50, 52, and 54. Water jets 44, 46, 48, 50, 52, and 54 are holes in skid plate 6 that intersect with various portions of the water passageway. Water jets 48, 50, 52, and 54 (shown in FIGS. 1 and 3) branch off of passageway 96 through skid plate 6 and expel water underneath support member 2. Water jet 44 branches off of passageway 98 through skid plate 6 and expels water underneath support member 2. Water jet 46 branches off of passageway 94 through skid plate 6 and expels water underneath support member 2.

Support member 2 also contains five holes 56, 58, 60, 62, and 64 that pass through support member 2 and facilitate the attachment of a masonry router or other tool to support member 2.

Figure 2:
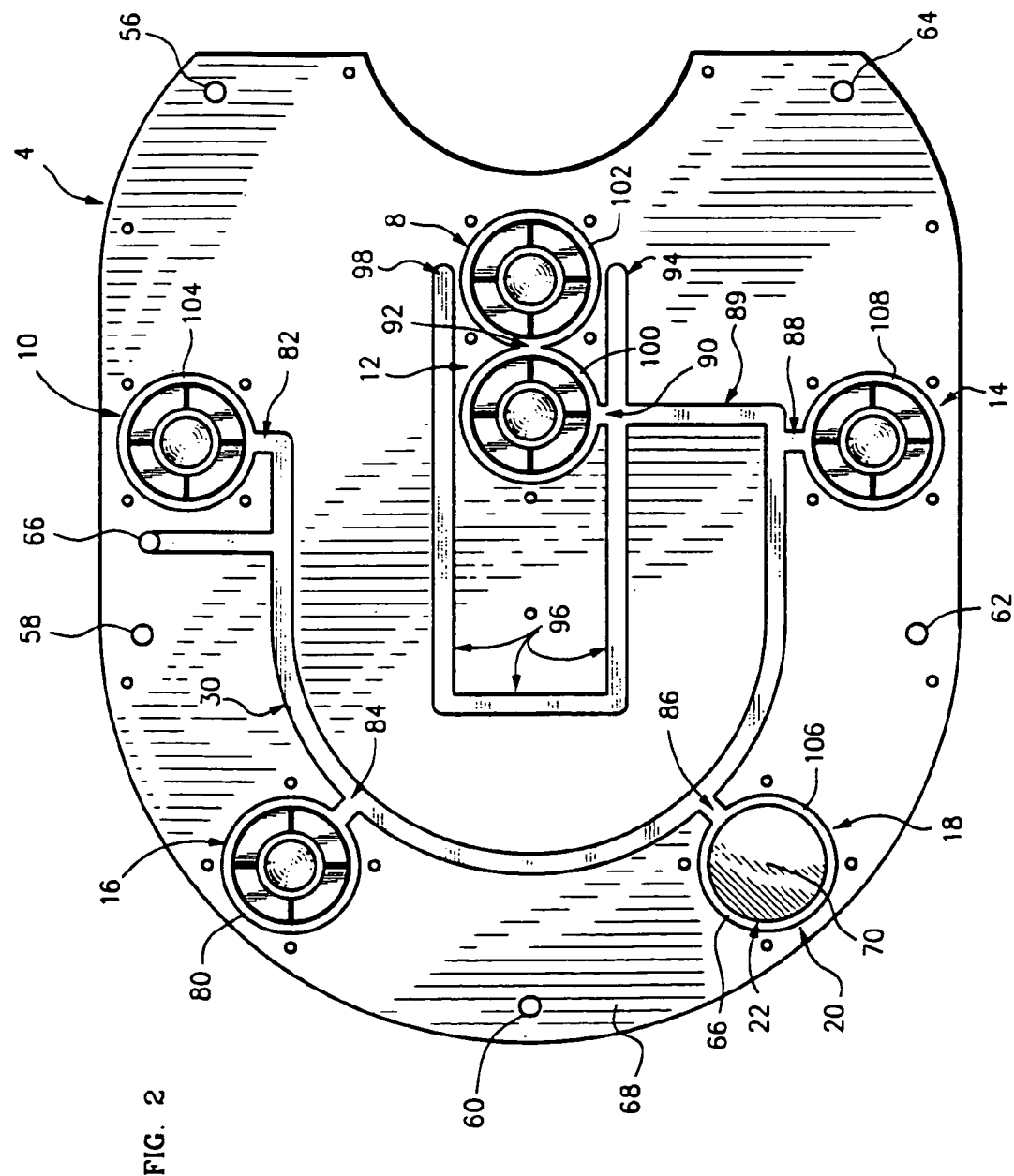
FIG. 2 is a plan view of a portion of a baseplate in accordance with the principles of the invention.

FIG. 2 shows a detailed plan view of top plate 4, and shows one possible configuration of water passageway 30. Note that other configurations of water passageways may be used without departing from the scope of the invention. In this example, water passageway 30 is formed in top plate 4 of support member 2. Any other known method resulting in the placement of a water passageway in support member 2 may be mused without departing from the scope of the invention. For example, the support member may be formed from a top and bottom layer but the passageway may be cut out of the bottom layer. Note also that although this example references water as the liquid that travels through the passageway, flushes the bearing block assemblies, and floats the router or other tool, other fluids or even gasses may be used for any or all of these purposes without departing from the scope of the invention.

In operation, pressurized water enters passageway 30 through inlet 66. The water travels throughout passageway 30 such that the entire passageway 30 is filled with pressurized water. There are several branches 82, 84, 86, and 88 off of the passageway 30 leading to circular water passageways 104, 80, 106, and 108 that surround bearing assemblies 10, 14, 16, and 18 respectively. An additional branch 89 off of passageway 30 leads to water passageways 94, 96 and 98. Opening, 90 connects the circular passageway 100 surrounding bearing block assembly 12 to the intersection of passageways 89, 94, and 96. Circular passageway 102 surrounding bearing block assembly 8 is connected to circular passageway 100 by gap 92. Thus, each bearing block assembly is surrounded by a circular water passageway connected to main water passageway 30. In addition, water jets 48, 50, 52, and 54 (shown in FIGS. 1 and 3) branch off of passageway 96 through skid plate 6 and expel water underneath support member 2. Water jet 44 branches off of passageway 98 through skid plate 6 and expels water underneath support member 2. Water jet 46 branches off of passageway 94 through skid plate 6 and expels water underneath support member 2. Water jets 44 and 46 are larger than water jets 48, 50, 52 and 54 so that more water is expelled in the front of the machine near the blade of the machine where debris from the substrate upon which the machine is working is generated.

Referring again to FIG. 1, each of the bearing block assemblies 8, 10, 12, 14, 16, and 18 are similar in construction and design, therefore only the bearing block assembly designated generally as 18 will be described in further detail. It should be noted that although the bearing block assemblies of this embodiment are similar, different sizes and designs of bearing block assemblies may be used in different locations without departing from the scope of the invention.

Each bearing block assembly includes a bearing block designated generally as 24, a plurality of ball bearings 26, and one main rotating ball 28. Bearing block 24 is preferably constructed of stainless steel but may be made from any other suitable material. Bearing block 24 is a circular disk shaped member having a bottom surface 72, a side surface 74, and an top surface (not shown) opposite bottom surface 72. In the center of bottom surface 72 is a hemispherical depression 76 to receive ball bearings 26 and main rotating ball 28. The bottom surface 72 of bearing block 24 also contains four grooves 78 placed at 90° angles around bottom surface 72. Grooves 78 allow water in circular passageway 106 to pass through grooves 78 and into depression 76. Depression 76 contains ball bearings 26 and main rotating ball 28. Ball bearings 26 are preferably made from stainless steel but any other suitable material may be used. Main rotating ball 28 is preferably made from nylon but any other suitable material may be used.

Surrounding each bearing block assembly 8, 10, 12, 14, 16, and 18 is a circular water passageway 102, 104, 100, 108, 80 and 106 respectively connected to water passageway 30. Portions of bearing block 24, top plate 4 and skid plate 6 make up the sides, top and bottom of the circular water passageways.

Figure 4:
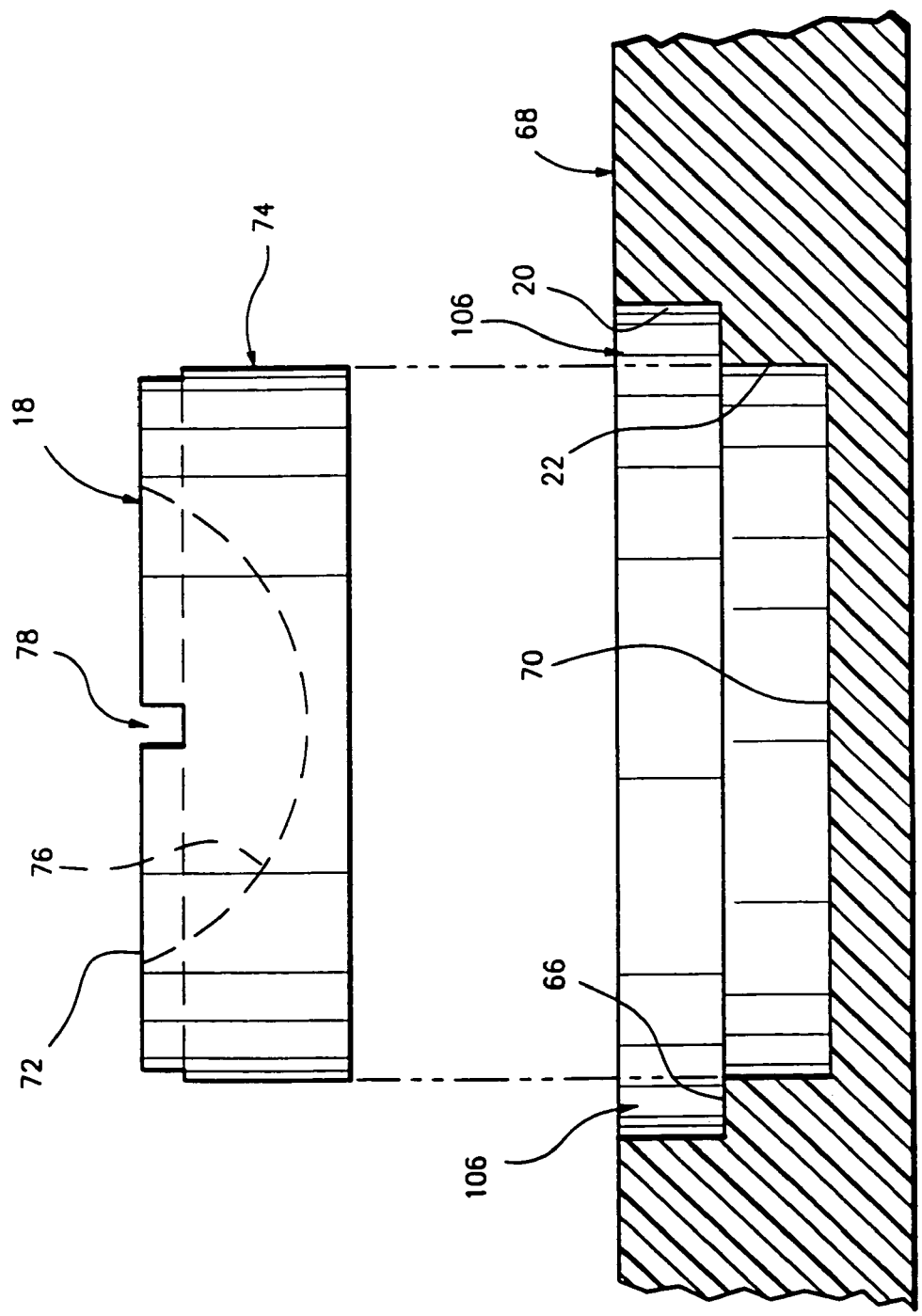
FIG. 4 is an exploded cross sectional detail view of an interior portion of a baseplate in accordance with the principles of the invention.

For purposes of simplicity, the following, discussion again refers only to bearing block assembly 18, however all of the remaining bearing blocks are configured in a similar manner. Surrounding and partially engaging bearing block 24 are two concentric circular cut-outs 20 and 22 (best shown in FIGS. 2 and 4). Circular cut-out 20 is wider in diameter and not as deep as circular cut-out 22. Centered within circular cut-out 20 is a second narrower in diameter and deeper circular cut-out 22. Thus, an annular lip 66 is formed between circular cut-out 20 and circular cut-out 22. Bearing block 24 fits into circular cut-out 22. The top surface (not shown) of bearing, block 24 rests against the bottom surface 70 of circular cut-out 22. The upper portion of side surface 74 of bearing block 24 fits within circular cut-out 22. Thus, circular channel 106 is formed around the circumference of bearing block 24 by circular cut-out 20, lip 66, and the remaining portion of side surface 74 of bearing block 24. The remaining portion of side surface 74 is spaced away from circular cut-out 20 to form the inside wall of channel 106. Skid plate 6 forms the bottom wall of circular channel 106.

Bottom surface 72 of bearing block 24 contains four grooves 78 placed at 90° angles around depression 76. When skid plate 6 is attached to the top plate 4, the grooves 78 define four narrow passageways that direct pressurized water from circular channel 106 into depression 76. Thus, ball bearings 26 and main rotating ball 23 are flushed with pressurized water from four different directions.

In operation, water passageway 30 is supplied with pressurized water through an inlet 66 (shown in FIG. 2). Water travels down water passageway 30 and is expelled through water jets 44, 46, 48, 50, 52, and 54. Water also travels from passageway 30, through opening 86 (for example), around the circular water passageway 106, through grooves 78, into depression 76 thereby flushing ball bearings 26 and main rotating ball 28, and out opening 42. The continuous flushing of bearing block assemblies 8, 10, 12, 14, 16 and 18 reduces the potential of the main rotating balls 28 becoming jammed with debris and thereby reducing the chance that the substrate (not shown) upon which the router or other tool is working will be scratched.

The expelled water forms a cushion of water upon which the router floats. In some cases, however, the cushion of water deteriorates. Such deterioration has been observed when the router approaches a corner of the substrate. When the water cushion deteriorates, the router rests on main rotating balls 28 of the bearing block assemblies 8, 10, 12, 14, 16, and 18.

It will be appreciated that a variety of materials may be used to make up the various portions of the invention. Although the present invention has been described in terms of certain preferred embodiments and exemplified with respect thereto, one skilled in the art will readily appreciate that various modifications, changes, omissions and substitutions may be made without departing from the spirit and scope of the present invention. It is intended that the present invention be limited solely by the scope of the following claims:

What is claimed is:

1. A baseplate for a tool comprising:
   a support member for moving a tool over a work surface;
   said support member having a passageway therein with an inlet for receiving fluid and at least one outlet for directing fluid underneath the support member to assist the movement of said support member relative to said work surface; and
   rotating means mounted to the bottom of said support member for allowing said support member to move relative to said work surface.

2. A baseplate for a tool according to claim 1 wherein said rotating means comprises:
   at least two main rotating balls; and
   said support member has at least two recesses in the bottom thereof, each recess for rotatable receiving a rotating ball.

3. A baseplate for a tool according to claim 2 wherein at least one recess has an outlet positioned therein for flushing said recess with fluid.

4. A baseplate for a tool according to claim 2 wherein at least one outlet is positioned on the bottom surface of said support member.

5. A baseplate for a tool according to claim 2 wherein at least one recess has an outlet positioned therein for flushing said recess with fluid, and at least one outlet is positioned on the bottom surface of said support member.

6. A baseplate for a tool according to claim 2 wherein said rotating means further comprises:
   a plurality of ball bearings located within one or more of said recesses to facilitate the rotation of the main rotating ball.

7. A baseplate for a tool according to claim 6 wherein at least one recess has an outlet positioned therein for flushing said recess with fluid.

8. A baseplate for a tool according to claim 6 wherein at least one outlet is positioned on the bottom surface of said support member.

9. A baseplate for a tool according to claim 6 wherein at least one recess has an outlet positioned therein for flushing said recesses with fluid, and at least one outlet is positioned on the bottom surface of said support member.

10. A baseplate for a tool according to claim 1 wherein at least one outlet is positioned on the bottom surface of said support member.

11. A baseplate for a tool according to claim 1 wherein said at least one outlet is positioned to direct fluid across the surface of said rotating means.

12. A baseplate for a tool according to claim 1 wherein at least one outlet is positioned on the bottom surface of said support member and at least one outlet is positioned to direct fluid across the surface of said rotating means.

* * * * *